3,422,087
PROCESS FOR FORMING CATIONIC POLY-SACCHARIDE ETHERS AND PRODUCT
George V. Caesar, Harbor Beach, Mich., assignor to Philip D. Caesar, Princeton, N.J.
No Drawing. Continuation-in-part of application Ser. No. 213,057, July 27, 1962. This application Mar. 8, 1965, Ser. No. 438,034
U.S. Cl. 260—233.3  15 Claims
Int. Cl. C08b *19/06*

ABSTRACT OF THE DISCLOSURE

Cationic starch ethers are prepared by reacting the starch in granule form with a quaternary ammonium salt of a tertiary amino alkylene oxide.

---

This is a continuation-in-part of my copending U.S. patent application Ser. No. 213,057, filed July 27, 1962, now Patent No. 3,243,426.

This invention relates to a process for forming cationic polysaccharide ethers having tertiary amino alkylene ether or quaternary ammonium alkylene ether substituents, by reacting the solid polysaccharide, such as starch in granule form, with a tertiary amino alkylene epoxide or a quaternary ammonium salt of a tertiary amino alkylene epoxide, and to the polysaccharide ethers formed by this process, comprising tertiary amino alkylene ether or quaternary ammonium alkylene ether groups.

The starches are a group of carbohydrates or polysaccharides occurring in many plant cells, and made up of anhydroglucopyranose units, $C_6H_{10}O_5$. Ordinary starch in external appearance is a white, soft, amorphous powder, in the form of microscopic granules whose structure is not yet fully known, but which consist of at least two fractions, amylopectin, a 1,6-branched structure, or alpha-amylose, a 1,4-straight chain structure. The starch granules are insoluble in cold water, but when the temperature of the water is raised above about 60° C., they become appreciably hydrated or swollen or gelatinized. Once starch granules have become swollen or gelatinized, it is impossible to reverse the reaction, and return them to their original cold-water-insoluble granule state. In this swollen state, starch is very difficult to process, and furthermore this product when processed lacks many of the desirable properties of starch in granule form.

It is, of course, well known that naturally-occurring starch granules can be improved by various chemical treatments. Because of the difficulty in recovering in dry form a partially gelatinized swollen or hydrated starch, these treatments are generally carried out on the unswollen starch granules, treating the unswollen starch granules in suspension in water, either at low or moderate temperatures, below about 60° C. Under such conditions, the treated products retain the desirable processing characteristics of the naturally-occurring starch granules, plus the additional modified properties imparted by the chemical reagents.

It was proposed, for instance, in U.S. Patent No. 2,131,120 to Schlack, dated Sept. 27, 1938, that starch be etherified by reacting with it in aqueous suspension with an alkylene oxide or alkylene oxide derivative containing atoms or atom groups of basic character, such as for example, amino and quaternary ammonium hydroxide groups. However, these reactions were carried out according to conditions described in the patent, at temperatures considerably in excess of 60° C., under which conditions starch is of course gelatinized and rendered very difficult to process. Consequently, this suggested procedure has not come into commercial use.

Kesler and Hjermstad in U.S. Patents Nos. 2,516,632, 2,516,633, and 2,516,634, dated July 25, 1950, described procedures for the partial etherification of starch in its original granule form, employing highly reactive alkylene oxides and halohydrins in water suspensions at a pH sufficiently low that the physical properties of the granules were not changed. The temperature and alkalinity recommended in this process range from 120 to 130° F. and 0.008 to 0.02 mole of sodium hydroxide per $C_6H_{10}O_5$ mole of starch, using high solids water suspensions of starch. This corresponds to a pH above 9.

It was pointed out in U.S. Patent No. 2,773,057 to Hjermstad and Kesler, patented Dec. 4, 1956, that this process was not applicable to the formation of starch ethers using alkyl chlorides. When these compounds were used, it was found that the reaction had to be carried out at a temperature and alkalinity much higher than was used previously. In accordance with this process, the starch is suspended in water, and the etherifying agent added to the suspension at a temperature of from 40 to 65° C. in the presence of a strong alkali, such as an alkali metal hydroxide, in an amount of from 0.1 to 0.28 mole per mole of starch. Such a high proportion of alkali is likely to gelatinize the starch in a high solids starch suspension, and consequently, an alkali metal salt such as sodium chloride is also required to inhibit gelatinization. Hjermstad et al. expressly point out that this process as described is unsuitable for use with epoxy compounds, such as epichlorohydrin, which under such conditions may produce a starch which cannot be gelatinized by boiling water, owing to crosslinking.

Paschall in U.S. Patent No. 2,876,218 patented Mar. 3, 1959, reported a confirmation of Hjermstad and Kesler's comment that epichlorohydrins even in small amounts will react with granular starch in aqueous suspensions under strongly alkaline pH conditions to form cross-linked starch ethers which are nongelatinizable in boiling water. In fact, Parschall indicated that he had found it impossible to control the reaction of epichlorohydrin with starch even by adding a tertiary amine to the reaction mixture in such a manner that a substantially epichlorohydrin-free reaction product was formed. If, however, the epichlorohydrin and the tertiary amine were reacted in advance to form a quaternary ammonium alkylene epoxide, this product could be reacted with starch in aqueous suspension in the presence of a strongly alkaline catalyst to form a quaternary ammonium starch ether in which the starch remained in a gelatinizable condition, and in which cross-linking was avoided or kept at a minimum. The catalyst employed in this reaction with the starch is a strongly alkaline compound such as an alkali metal hydroxide, an alkaline earth oxide or hydroxide, or a quaternary ammonium base, and the amount of catalyst used is of the order of from 0.01 to 0.2 mole of catalyst per molecular weight $C_6H_{10}O_5$ of anhydroglucopyranose units of the starch.

Contemporaneously with Paschall, Caldwell and Wurzburg in U.S. Patent No. 2,813,093, patented Nov. 12, 1957, described the etherification of starch using a tertiary amino alkylene epoxide or halide. In this reaction, the starch in aqueous suspension was treated with the etherification reagent in the presence of a strong alkali such as an alkali metal hydroxide or quaternary ammonium hydroxide. Caldwell et al. prevented gelatinization of the starch in the course of the process by adding a gelatinization-retarding chemical such as sodium sulfate.

Hullinger and Yui in U.S. Patent No. 2,970,140, patented Jan. 31, 1961, also described a process of reacting starch in aqueous suspension under conditions in which the starch is not pasted, employing a dialkyl aminoalkyl halide as the reagent. The amount of amine reagent is limited to a maximum of about 0.11 mole per mole of dry starch ($C_6H_{10}O_5$) solids in the reaction slurry, and the pH is maintained between 8.0 and 12.0, and preferably from 9.0 to 11.5. The pH cannot be permitted to exceed 12, or the starch will paste, according to the patentees. The alkali reagents employed include alkali metal hydroxides and water-soluble alkaline earth metal hydroxides, and amine bases such as mono-, di- and tritertiaryamines, as well as basic salts such as trisodium phosphate.

It will be noted that each of the above-disclosed processes is carried out in aqueous suspensions of the starch, and requires the use of a strong alkali such as an alkali metal or alkaline earth metal hydroxide to effect the etherification. As was pointed out in Patent No. 2,773,057, practically all etherifying reagents are reacted with starch or with cellulose in the presence of aqueous alkali. Nonetheless, as the patentees have recognized, the use of strong alkali presents many problems. The susceptibility of starch to swelling or gelatinization is greatly increased by the action of alkali, and consequently, in order to prevent gelatinization, it is usually necessary, as in the case of Patent No. 2,876,217, to employ a gelatinization inhibitor.

Moreover, the use of alkali introduces a separation problem. The stability and often the utility of starch is greatly reduced in the presence of alkali, and consequently, it is desirable at the completion of the etherification reaction to neutralize the alkali by the addition of acid, after which the salt that is formed must be separated by washing. This of course greatly increases the cost of the process, and renders it less attractive from a commercial standpoint.

Merle, Comptes Rendus, V, 246 (1958) 1425–1426, described the reaction of rice starch in aqueous suspension with epoxy-1,2-diethylamino-3-propane in the absence of alkali at 100° C. for four hours. Under these conditions, of course, the starch was completely gelatinized.

In accordance with the instant invention, a process is provided for etherifying starch and other polysaccharides in the solid state to introduce cationic tertiary amino or quaternary ammonium alkylene ether groups. The reaction is carried out in the absence of a fluid reaction medium in excess of the amount of fluid medium that can be wholly absorbed by the solid polysaccharide particles or granules, and in the absence of strong alkali, under which conditions the gelatinization of the polysaccharide particles or granules is completely avoided. The result is a very considerable simplification of the process. Moreover, the process in accordance with the invention can be carried out on the solid polysaccharide using only the amount of a carrier needed to disperse the etherifying reagent, which is absorbed by the polysaccharide, so that no separation or purification fo the polysaccharide ether is required at the conclusion of the process.

In accordance with the invention, solid starch granules are reacted with a tertiary amino alkylene epoxide or with a quaternary ammonium alkylene epoxide at a temperature below about 200° C. in the absence of a suspending fluid and in the absence of strong alkali. The resulting product has the desirable properties of a cationic starch, and in addition is alkali- and salt-free, due to the absence of alkali or neutralization products thereof.

No ingredients are necessary to effect the reaction other than the polysaccharide and etherifying agent. Inasmuch as the etherifying agents in accordance with the invention are solids, it will however generally be found to be desirable to disperse or dissolve the etherifying agent in a liquid vehicle, which is preferably inert both to the etherifying agent and to the polysaccharide. These compounds are water-soluble, and water is accordingly the preferred vehicle, because it is easily removed at the completion of the reaction. However, any inert vehicle in which the etherifying agent is soluble can be used, such as lower aliphatic alcohols, for instance, ethanol and propanol, 2-nitropropane, and dimethyl formamide. The amount of water or other vehicle used should not be more than is required to ensure a uniform distribution of the etherifying agent in the amount stoichiometrically required for the desired degree of etherification.

The absence of a suspending fluid for the starch makes it possible to use concentrated solutions or dispersions of the etherifying agent. The usual prior art concentrations of etherifying agent are 2% or less, by weight of the suspending fluid. In the process of the invention, solutions or dispersions of etherifying agent ranging from about 5 to about 75%, and preferably from 50 to 70%, etherifying agent by weight of the solution or dispersion can be employed. The polysaccharide particles or granules adsorb or absorb the reagent solution of dispersion, and the surface reaction rate is thereby increased without the need for a strongly alkaline catalyst.

The amount of the etherifying agent is at most 0.10 mole, and preferably within the range from about 0.01 to about 0.05 mole per mole of the polysaccharide. More than 0.10 mole can be used, but is not normally required to impart the desirable cationic properties to the polysaccharide ether product of the invention, and therefore generally would not be used. Such amounts are wholly absorbed by the polysaccharide in the course of the reaction, so that the final ether is a dry-appearing product which apart from an optional drying step requires no further purification or treatment before use.

Starch granules frequently contain large proportions of absorbed or adsorbed water, ranging normally from 10 to 12% by weight. This must of course be taken into account, if the treating solution is to be wholly absorbed by the starch, since the total amount capable of being absorbed is about 20 to 25%, before lumping or slurry formation occurs. Sometimes, if the starch is very wet, a solid etherifying agent can be expected to dissolve in such absorbed or adsorbed water, so that no additional water need be added.

Other polysaccharides are similar to starch in their ability to absorb or adsorb relatively large amounts of water, up to 20 to 25% by weight. Many polysaccharides such as the gums, are water-soluble, so that avoidance of the use of water in excess of that which can be wholly taken up by the polysaccharides prevents the formation of a solution thereof, with a very considerable simplification of the processing of the polysaccharide during and after the etherification reaction.

The process of the invention is applicable to any polysaccharide, whether water-soluble or water-insoluble.

A preferred polysaccharide is starch, which is preferably treated in its natural granule form. Naturally-occurring starches which can be used include potato starch, arrowroot starch, cassava or tapioca starch, oat starch, wheat starch, rice starch, maize or cornstarch, buckwheat starch, rye starch, barley starch, pea starch, bean starch and sago starch. The invention also is applicable to pregelatinized starches of any of the above types, and modified forms, i.e., modified with acid or with an oxidizing agent, provided the starch remains in its natural unswollen granule form. Also included are the dextrinized, hydrolyzed, oxidized, esterified and etherified starches, whether in unswollen granule form, or not.

The process is also applicable to the polymannoses and the polygalactomannans. The polymannoses have two cis hydroxyl groups in the 1-, 2-position of each mannose unit in the polymannose chain and one OH group attached in the form of a $CH_2OH$ group. Typical are vegetable ivory mannan A, vegetable ivory mannan B, yeast mannan, salep mannan and Konjuku mannan.

The galactomannans are polymannoses having single galactose units attached through 1,6-glycosidic linkages to the polymannose chain. Locust bean gum, tamarind gum, and guar gum are the principal sources of galactomannans, but they are also found in other vegetable mucilages and legume seeds such as alfalfa and clover seeds.

The etherifying agents in accordance with the invention have a terminal epoxy group linked through an alkylene group to a tertiary amino or quaternary ammonium group. They accordingly can be defined by the following formula:

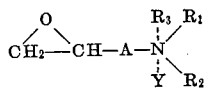

In the above formula, A represents an alkylene group, which can have a straight chain or a branched chain, and which can have from one to about ten carbon atoms, $R_1$, $R_2$ and $R_3$ are hydrocarbon radicals, such as alkyl, aryl, alkaryl, aralkyl and cycloalkyl radicals, having from one to about ten carbon atoms, of which $R_1$ and $R_2$ can be taken together to form a heterocyclic ring including the nitrogen, as in piperidine or piperazine, in which case $R_1$ and $R_2$ are alkylene of from three to six carbon atoms, and Y is an inorganic or organic salt anion, such as halide, for instance, chloride, bromide, fluoride, or iodide, nitrate, nitrite, sulfate, acetate, formate, p-tosylate, propionate, phosphate, borate, and thiocyanide. The dashed bonds indicate groups present only in the quaternary ammonium compounds.

The tertiary amino compounds if desired can be used in the form of their inorganic or organic acid salts,

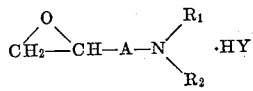

Y represents an inorganic acid anion, as above. Exemplary salts include the hydrochloride, hydrobromide, hydroiodide, hydrosulfate, hydronitrate, hydroborate, hydrophosphate, hydroacetate, hydroformate, hydrooxalate, and hydrotartrate salts.

Preferably, the A radical is a short chain alkylene group having one, two or three carbon atoms in a straight chain with one or two short chain alkyl groups of at most five carbon atoms attached to the chain carbon atoms. $R_1$, $R_2$, $R_3$ are preferably lower alkyl, such as methyl, ethyl, propyl, isopropyl, n-butyl, isobutyl, or tertiary butyl.

$R_1$, $R_2$ and $R_3$ also can be long chain alkyl, such as octyl, 2-ethyl hexyl, heptyl, nonyl, and decyl, aryl, such as phenyl, tolyl, xylyl, phenylphenylene, naphthyl, and trimethylphenyl, alkaryl, such as benzyl, phenylene and butyl phenylene, and cycloalkyl, such as cyclohexyl and cyclopentyl.

The A and R radicals can, if desired, include additional epoxy groups, thus forming bis-epoxy compounds reactive with the polysaccharide, with the functional group at two positions, and therefore capable of cross-linking. Such bifunctional compounds can be used alone or in admixture with the monofunctional etherifying agents.

Exemplary etherifying agents conforming to the above requirements include N-2-3-epoxypropyl trimethyl ammonium chloride, N-3,4-epoxybutyl triethyl ammonium bromide, N-2,3-epoxybutyl methyl diethyl ammonium iodide, N-2,3-epoxypropyl triethyl ammonium bromide, N-2,3-epoxybutyl methyl diethyl ammonium iodide, N-2,3-epoxypropyl triethyl ammonium chloride, N-2,3-epoxypropyl dimethyl amine hydrochloride, N-3,4-epoxypropyl diethyl amine hydrobromide, N-2,3-epoxypropyl methyl ethyl amine hydrochloride, N-2,3-epoxypropyl piperazine, N-2,3-epoxypropyl methyl piperazine chloride, N-2,3-epoxypropyl methyl diethyl ammonium chloride, N-2,3-epoxypropyl methyl piperazine p-tosylate, N-(2,3-epoxypropyl)trimethyl - ammonium p-tosylate, 2,3-epoxypropyldimethylamine, N,N-bis(2,3-epoxypropyl) methylamine, N,N'-1,4-bis(2,3-epoxypropyl) piperazine, N,N'-1,4-bis(2,3 - epoxypropyl)piperazine N,N-bis(2,3-epoxypropyl)dimethyl ammonium p-tosylate, 2-butynylene - bis N,N - bis(2,3 - epoxypropyl) - N - methylammonium mesylate, and N-2,3-epoxypropyl trimethylammonium p-tosylate.

From the standpoint of cost, the lower molecular weight etherifying agents are preferable, since the reaction is stoichiometric.

If the polysaccharide, such as the starch or galactomannan, molecule or micelle be represented by the formula polysaccharide-OH, in which OH is an etherifiable hydroxy group of the molecule, the reaction with the alkylene tertiary amine or quaternary ammonium epoxide etherifying agents can be represented as follows:

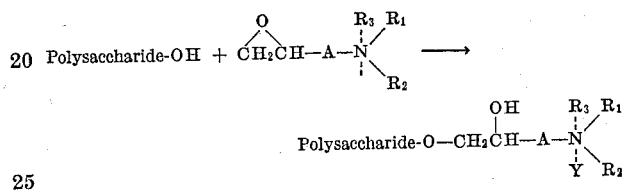

The amount of etherifying agent employed depends upon the cationic properties which are to be imparted to the polysaccharide. Starch ethers containing tertiary amino alkylene groups and quaternary ammonium alkylene groups are referred to in the art as cationic starch, and are desirable flocculating agents for anionic colloids, suspending agents, and sizing agents. They can be gelatinized and dried as on heated rolls in a conventional manner, to make them cold-water soluble. A fully positive charge is retained by the quaternary ammonium starch derivatives at all pH values, and they gelatinize in hot water to form clear or viscous pastes which are retarded in set-back on standing. These properties are augmented when a sufficient amount of the etherifying agent is reacted with the starch, and the proportion of such ether groups will determine the range of such properties possessed by the starch ether product. The same is true of other polysaccharides.

Theoretically, three hydroxy groups of each saccharide unit of the polysaccharide chain, for example, anhydroglucopyranose unit $C_6H_{10}O_5$ of the starch chain or each galactose unit $C_6H_{10}O_5$ of a galactomannan chain, can be etherified. The degree of substitution (DS) is 1.0, when one hydroxy group in each such unit is etherified, and 3.0, when three hydroxy groups of each such unit are etherified. Average DS values appear as decimal fractions of the integer values, and mean that the polysaccharide ether is made up of saccharide units having whole number DS values embracing the average. The cationic properties imparted to the polysaccharide do not appear to be a straight line function of the DS value, and fall off as the DS increases. Considering the properties obtained, relatively low DS values averages less than 0.1, and preferably ranging from about 0.01 to about 0.05 are quite satisfactory, and because of the relative cost of the etherifying agent, are quite practical commercially.

The reaction proceeds at ambient temperatures, although rather slowly. The upper limit of reaction temperature is imposed by the browning temperature of the polysaccharide, which is usually about 200° C., and the decomposition temperature of the etherifying agent, whichever be the lower. For optimum reaction rate, the temperature is within the range from about 100 to about 150° C.

The reaction time may range from as little as a few minutes to upwards of one hour at the higher temperatures of from 150 to 200° C., while at lower temperatures, ranging from 25° C. to 60° C., reaction is complete within about twelve to sixteen hours.

The reaction time will also be a function of the DS desired. However, inasmuch as relatively high aqueous concentrations of etherifying agents are used, the reaction times in the instant invention are shorter than they would be, were one to use the normal dilute aqueous starch suspension concentrations of the etherifying agent.

It is generally preferable to spray the etherifying agent as a dispersion or solvent solution in an inert fluid medium over the surface of the polysaccharide particles or granules, using a mixer to ensure uniform distribution of the sprayed mixture throughout the mass. The particles or granules of polysaccharide can then be permitted to react with the etherifying agent at ambient temperature or a more elevated temperature until reaction is complete. The polysaccharide ether is then ready for use without further processing, but it can be washed, if desired, to remove any unreacted etherifying agent.

The process of the invention can be carried out as a batch process, or as a continuous process. A batch process may be preferable where the polysaccharide such as starch is to be used directly as in sizing. A continuous process may be preferable in a commercial operation where the ether is recovered as a final product and sold as such. In a continuous process, the particles or granules would be continuously blended with the etherifying agent at one point in the reaction system, and then brought to a reactor, which may be in the form of a long tube, the transit time through which is equal to the desired reaction time. After emergence from the reactor, the polysaccharide ether can be dried and is then ready for use, or packaging and sale.

The polysaccharide ether obtained as a final product from the process of the invention comprises discrete particles or granules which closely resemble in external appearance the original untreated particles or granules. The material can be powdered or pulverized to a finely-divided condition, if desired.

As compared to prior starch and other polysaccharide ethers prepared by processes using strongly alkaline catalysts, the ethers of the invention are characterized by being substantially free from alkali and therefore free from the inorganic or organic salt by-products of the neutralization reaction required to purify the prior ethers and remove excess residual alkali. Salts, such as sodium acetate, exerting a plasticizing effect on starch films, may be included. In contrast, the process of the invention does not require any alkali. Consequently, no alkali having been introduced, the product is free from alkali at the conclusion of the process. This means further that it has a higher stability.

Furthermore, because of the absence of alkali, it is not necessary to employ a starch gelatinization inhibitor during the etherification of starch, and this is an additional ingredient, accordingly, of which the starch ethers of the invention are free.

The starch ethers of the invention in most cases have a lower gelatinization temperature and a higher viscosity than natural starch. The gelling and retrogradation tendencies are minimized, and they have increased film flexibility, and tend to improve formation in paper-making, as well as retention of pigments. Hence, these derivatives are advantageously used in the wet end of paper-making, and also in the coating of paper.

The following examples, in the opinion of the inventor, represent preferred embodiments for carrying out the invention:

EXAMPLE 1

50 grams of tapioca fluor of normal moisture content (about 10%) was slurried in 200 ml. of carbon tetrachloride, after which 4.6 grams of glycidyltrimethyl ammonium p-tosylate, dissolved in 4.6 grams of water, was added with rapid agitation. After the etherifying agent solution had been absorbed by the starch, the slurry was pressure-filtered, and the filter cake crumbled and dried in air at room temperature to remove carbon tetrachloride. The product was bottled, and warmed at about 40° C. for twelve hours, in order to effect reaction of the glycidyltrimethyl ammonium p-tosylate with the starch. At the end of this reaction period, the product was slurried in cold water, pressure-filtered, repeatedly washed with lukewarm water to remove unreacted etherifying agent, and then dried in air to approximately normal moisture content. Rheological properties were determined in a 5% aqueous slurry cooked to 190° F. and slowly cooled to 150° C., a preferred temperature for viscosity determined by a Brookfield LVF Viscometer. Viscosities were compared against a blank test on the original tapioca starch.

TABLE I

| Rheology | At 6 r.p.m. | At 12 r.p.m. | At 30 r.p.m. | At 60 r.p.m. |
|---|---|---|---|---|
| Tapioca flour | 2,600 | 1,700 | 1,080 | 720 |
| Tapioca flour (cps.) | 2,600 | 1,700 | 1,080 | 720 |
| Starch ether of Example 1 (cps.) | 5,600 | 3,550 | 2,040 | 1,390 |

+%: 0.41%, corresponding to a DS of 0.05.

It is apparent that the starch ether in accordance with the invention has a considerably higher viscosity than tapioca flour.

EXAMPLE 2

100 grams of tapioca fluor of normal moisture content was slurried in 200 ml. of cold water, pressure-filtered and the cake finely crumbled. Thereupon 9.2 grams of glycidyltrimethyl ammonmium p-tosylate dissolved in 9.2 grams of water was blended in by hand. This damp product, containing about 40% moisture, was divided in four about equal parts. Two parts were bottled as damp solids, and water added to the other two to form thick slurries of approximately 50% starch. These were also bottled. The four samples were then warmed at about 40° C. for twelve hours. At the end of this reaction period each of the products was slurried in cold water, pressure-filtered, repeatedly washed with luke warm water to remove any unreacted glycidyltrimethyl ammonium p-tosylate, and dried at atmospheric pressure to approximately normal moisture content. Rheological properties were determined in a 5% aqueous slurry cooked to 190° F. and slowly cooled to 150° F., and the viscosity then determined by a Brookfield LVF Viscometer. The viscosities were compared against the original tapioca flour, with the following results:

TABLE II

| Rheology | At 6 r.p.m. | At 12 r.p.m. | At 30 r.p.m. | At 60 r.p.m. |
|---|---|---|---|---|
| Tapioca flour (cps.) | 2,600 | 1,700 | 1,080 | 720 |
| Starch ether of Example 2 (average of 4 samples) (cps.) | 4,350 | 2,790 | 1,640 | 1,120 |

+% (Average): 0.095%, corresponding to a DS of about 0.01.

EXAMPLE 3

5 pounds of a 60 fluidity corn starch was charged into a 15 gallon rotating drum reactor, formed by hot plates. 50 grams of anhydrous powdered sodium acetate was added, and the tumbling starch granules were then sprayed with 100 grams of glycidyldiethylamine, dissolved in 100 grams of water. Tumbling was continued while the starch was warmed at 40° C. for twelve hours. Thereupon, the starch ether was brought to a pH of 5.0 to 5.5 by addition of glacial acetic acid, and allowed to tumble for thirty minutes more, after which it was discharged from the reactor.

The pH of this reaction mixture was approximately 8, due to the amine base. Nitrogen content was 0.28%, corresponding to an approximate DS of 0.04.

EXAMPLE 4

5 pounds of tapioca flour was charged into a 15 gallon rotating drum reactor warmed by hot plates. 50 grams of sodium sulfate was added, and then the tumbling starch granules were sprayed with 91 grams of glycidyltrimethylammonium chloride in the form of a 65% aqueous solution. Tumbling was continued at 40° C. for twelve hours. The product was then removed from the reactor and slurried in cold water, pressure-filtered, and repeatedly washed with lukewarm water. The washed starch ether product had a nitrogen content of 0.23%, approximating a DS of 0.03. Rheological properties were determined on a 5% aqueous slurry of the material cooked to 190° F. and slowly cooled to 150° F., and were as follows:

TABLE III

| Rheology | At 6 r.p.m. | At 12 r.p.m. | At 30 r.p.m. | At 60 r.p.m. |
|---|---|---|---|---|
| Tapioca flour (cps.) | 2,600 | 1,700 | 1,080 | 720 |
| Starch ether of Example 4 (cps.) | 6,100 | 4,100 | 2,500 | 1,700 |

EXAMPLE 5

Example 4 was repeated, employing 65 grams of the glycidyltrimethylammonium chloride in 65% aqueous solution. The product recovered had a DS of about 0.02. Rheological properties, determined as in Example 4, were as follows:

TABLE IV

| Rheology | At 6 r.p.m. | At 12 r.p.m. | At 30 r.p.m. | At 60 r.p.m. |
|---|---|---|---|---|
| Tapioca flour (cps.) | 2,600 | 1,700 | 1,080 | 720 |
| Starch ether of Example 5 (cps.) | 6,000 | 4,000 | 2,350 | 1,500 |

This product, although having a lower DS value, had rheology practically identical to that of Example 4.

EXAMPLE 6

5 pounds of tapioca flour was reacted with 75 grams of glycidyltrimethylammonium chloride and 75 grams of glycidyldimethyl amine as a 65% aqueous solution, using the reactor of Example 3 but in the absence of any salts. The reaction was carried out with continuous tumbling at 55° C. for twelve hours.

The percent nitrogen found in the starch ether product was 0.40%, corresponding to 0.14% quaternary nitrogen and 0.26% for tertiary nitrogen.

The starch ether of the invention, because of its positive charge, is particularly advantageous in paper making, due to its enhanced retention of pigment fillers in the paper. This is particularly important when efficient and relatively costly pigments, such as titanium dioxide, are used. The following illustrates the application of the starch ether product of Example 6 in a hand sheet of a bleached semi-chemical hardwood pulp, beaten to 400 Canadian Standard Freeness with 10% titanium dioxide based on the dry weight of the fiber.

The product was compared with pearl corn starch as a control and with a commercial cationic starch as a control. All three starches tested were cooked at 3% solids and diluted to 0.75% before addition to the beaten pulps. The unsubstituted corn starch was added at a 1% level based on the dry pulp, and each of the two cationic starches added at a 0.5% level based on the dry pulp. The titanium dioxide retention of the paper was then determined by the standard ash test, with the following results:

| | Percent |
|---|---|
| Pearl corn starch | 4.3 |
| Commercial cationic starch | 5.4 |
| Starch ether of Example 6 | 5.6 |

EXAMPLE 7

5 pounds of pearl corn starch was charged into the 15 gallon rotating drum reactor of Example 3, and 75 grams of anhydrous powdered sodium acetate was added. The contents were then sprayed with 100 grams of glycidyldiethylamine as a 50% aqueous solution, and the reaction mixture warmed with continuous tumbling at 40° C. for twelve hours. At the conclusion of the reaction, the pH was brought to 5 to 5.5 with glacial acetic acid, after which the product was allowed to tumble for thirty minutes longer, and then discharged. The reaction product was slurried in cold water, pressure-filtered, and repeatedly washed with lukewarm water. The nitrogen content of the washed product was 0.45%, corresponding to a DS value of about 0.05.

In the claims, the term "free from strong alkali" is used to exclude any strong alkali such as sodium hydroxide or quaternary ammonium hydroxide from the reaction system, and the term "free from unabsorbed reaction medium" is used to exclude from the reaction system any reaction medium that is not wholly absorbed in or on the polysaccharide particles or granules, such as a reaction medium suspending the polysaccharide in slurry or solution form during any part of the reaction. The term "consisting essentially in" is employed with like intent in defining the process.

Having regard to the foregoing disclosure, the following is claimed as the inventive and patentable embodiments thereof:

1. A process for forming a cationic starch ether consisting essentially of reacting a solid starch in particulate form with a quaternary ammonium alkylene epoxide etherifying agent having the formula $$\underset{CH_2-CH-A-N-R_1}{\overset{O}{\diagdown}\phantom{CH-A-}\overset{R_3}{|}}\phantom{R}\underset{Y\phantom{--}R_2}{}$$

wherein A represents an alkylene group having from 1 to 10 carbon atoms, $R_1$, $R_2$ and $R_3$ are hydrocarbon radicals having from 1 to 10 carbon atoms and $R_1$ and $R_2$ can be taken together to form a ring in which case $R_1$ and $R_2$ are alkylene groups having from 1 to 3 carbon atoms and Y is an anion selected from the group consisting of chloride, bromide, fluoride, iodide, nitrate, nitrile, sulfate, acetate, formate, p-tosylate, propionate, phosphate, borate and thiocyanide at a reaction temperature in the range of from 25° C. to 200° C. for from a few minutes up to sixteen hours in an unabsorbed reaction medium and in a reaction system free from strong alkali.

2. A process in accordance with claim 1 in which the epoxide is applied in aqueous solution.

3. A process in accordance with claim 2 in which the epoxide is applied in aqueous solution at a concentration from about 50 to about 70% by weight of the solution.

4. A process in accordance with claim 1 in which the reaction temperature is within the range from 100 to about 150° C.

5. The process in accordance with claim 1 wherein the etherifying agent is glycidyltrimethyl ammonium p-tosylate.

6. A process in accordance with claim 1 wherein a sufficient molar proportion of epoxide is reacted with the starch to form a cationic polysaccharide ether having a DS below about 0.1.

7. A process in accordance with claim 1 wherein a sufficient molar proportion of epoxide is reacted with the starch to form a cationic polysaccharide ether having a DS within the range from about 0.01 to about 0.05.

8. A process in accordance with claim 1 wherein the starch is tapioca flour.

9. A process in accordance with claim 1 wherein the starch is corn starch.

10. A process in accordance with claim 1 wherein the starch is potato starch.

11. A process in accordance with claim 1 wherein the etherifying agent is glycidyltrimethyl ammonium chloride.

12. The cationic starch ether produced by the process of claim 1.

13. A cationic starch ether in accordance with claim 12 wherein the cationic ether group is in a proportion represented by a DS value within the range from about 0.01 to about 0.05.

14. A cationic starch ether in accordance with claim 13 in which the etherifying agent is glycidyltrimethyl ammonium p-tosylate.

15. The cationic starch ether in accordance with claim 13 in which the etherifying agent is glycidyltrimethyl ammonium chloride.

References Cited

UNITED STATES PATENTS

| | | | |
|---|---|---|---|
| 3,087,852 | 4/1963 | Hofreiter et al. | 162—175 |
| 3,102,112 | 8/1963 | Carter et al. | 260—231 |
| 3,067,152 | 12/1962 | Fukushima et al. | 260—17.4 |

DONALD E. CZAJA, *Primary Examiner.*

R. W. MULCAHY, *Assistant Examiner.*